Jan. 10, 1950 J. O. SPRIGGS ET AL 2,494,212
MOLDING MACHINE FOR MANUFACTURING BUILDING BLOCKS
Filed July 22, 1947 8 Sheets-Sheet 1

Fig. 1.

Inventors
JAMES O. SPRIGGS
FREDERICK HARRIS
By Albert M Zalkind
Attorney

Fig. 3.

Inventor
JAMES O. SPRIGGS
FREDERICK HARRIS

Jan. 10, 1950   J. O. SPRIGGS ET AL   2,494,212
MOLDING MACHINE FOR MANUFACTURING BUILDING BLOCKS
Filed July 22, 1947   8 Sheets-Sheet 6

Inventors
JAMES O. SPRIGGS
FREDERICK HARRIS

By Albert M. Zalkind
Attorney

Jan. 10, 1950 J. O. SPRIGGS ET AL 2,494,212
MOLDING MACHINE FOR MANUFACTURING BUILDING BLOCKS
Filed July 22, 1947 8 Sheets-Sheet 7

Inventors
JAMES O. SPRIGGS
FREDERICK HARRIS

By Albert M. Zalkind
Attorney

Jan. 10, 1950 J. O. SPRIGGS ET AL 2,494,212
MOLDING MACHINE FOR MANUFACTURING BUILDING BLOCKS
Filed July 22, 1947 8 Sheets-Sheet 8

Inventors
JAMES O. SPRIGGS
FREDERICK HARRIS

By
Albert W. Zalkind
Attorney

Patented Jan. 10, 1950

2,494,212

UNITED STATES PATENT OFFICE 2,494,212

MOLDING MACHINE FOR MANUFACTURING BUILDING BLOCKS

James O. Spriggs and Frederick Harris, Washington, D. C.

Application July 22, 1947, Serial No. 762,640

9 Claims. (Cl. 25—65)

This invention relates to machines for manufacturing building blocks from plastic materials and, more particularly, to fully automatic machines of the class described.

In the concrete building block industry, it has been the usual practice to employ machines which operate in an intermittent or sequential manner, making at most three standard large size blocks at a time. This procedure limits the rate at which block may be produced with any practicable machine. Even the higest capacity, fully automatic machines known in the industry operate in a manner which employs motions in sequence, requiring large accelerations of various parts of the machinery and of material before and after forming the raw blocks, with consequent loss of time due to superfluous motion. Machine members of large size as well as a large power source are required. This type of machine is subject to faulty operation and excessive wear because of the inherently complex nature of the mechanisms required for producing the motions involved. Further, this type of construction is, of necessity, difficult to manufacture, resulting in high production costs, and requires frequent servicing.

In addition, prior machine present blocks for off-bearing and stacking in an inefficient manner due to the fact that relatively few blocks are available for off-bearing at one time. The filling of a drying rack with molded blocks in this manner requires a greater number of handling operations and increases the probability of breakage of the green blocks.

Accordingly, it is an object of our invention to provide a fully automatic block molding machine of novel and simple construction capable of a high production rate wherein the blocks are molded while in smooth continuous motion, with no intermittent action, or indexing, in the molding cycle from hopper to conveyor, but having novel safety features operable in the event of abnormal operation of the machine.

It is another object of our invention to provide a novel and effective vibratory feed and compacting means of simple and economical construction.

It is a further object of the invention to provide a machine capable of adjustability to predetermine the size of blocks produced and also capable of compensatory charge adjustment to correct for changes in consistency or other characteristics of the plastic or cementitious mix fed from the hopper.

A still further object of the invention is to so devise our machine as to effect a sufficiently slow physical motion of the blocks during the molding cycle as to substantially eliminate any problem of breakage of the parts of the machine or of the green blocks, and yet achieve a very high production rate.

It is an even further object of our invention to provide a machine capable of selective operation as to the type and size of pallets and mold boxes used, to the end that either solid or cored blocks of various shapes and sizes may be produced.

We accomplish the above objects by providing a continuously rotating mold table carrying a plurality of angularly spaced mold boxes in conjunction with a pallet feed device, a hopper, a vibratory tamping mechanism and a conveyor system. Means including push rods and a cam are employed to sequentially actuate each pallet after it is received in its respective mold. The functions of the several parts are so timed as to receive a predetermined charge in each mold box in turn as it passes below the hopper. The vibratory mechanism is so arranged as to effect vibration of the mix in the hopper adjacent to the discharge end so as to insure proper fluidity for flow of the mix; the same vibratory mechanism effects vibration of a trowel plate on the top of each block as it passes from below the hopper outlet. Simultaneously with trowel plate vibration on the top of a block, the associated pallet is forced upwardly from below so as to compress the block against the vibrating trowel plate. The degree of compression is adjustable, without stopping the machine, to compensate for variations in mix and to suit various operating conditions. Ultimately, and without interruption of its motion about the axis of the mold table, the molded blocks and their respective pallets are raised above the table level and tangentially engage a conveyor belt devised to off-bear each block in turn, the blocks then resting on their respective pallets and being removed therewith from the conveyor belt for curing and drying.

A detailed description of our invention now follows with reference to the appended drawings in which.

Figure 1:
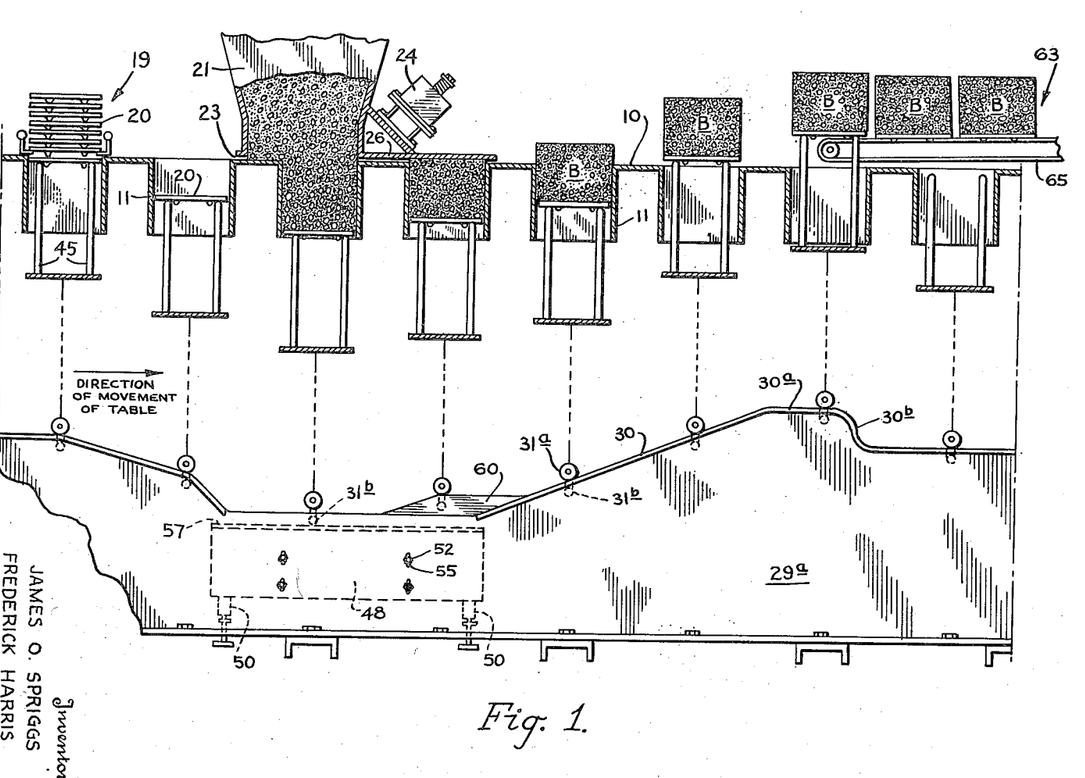
Fig. 1 is a developed layout which illustrates diagrammatically the several stages of the molding cycle.
Figures 2, 7:
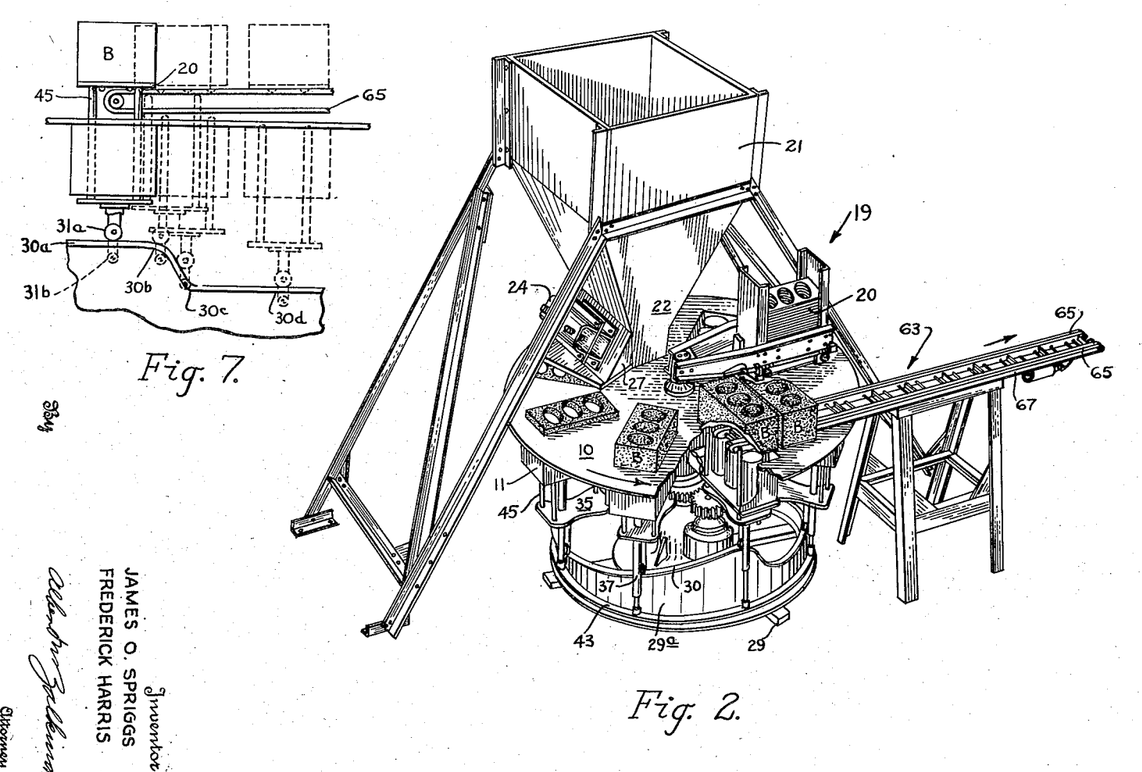
Fig. 2 is a perspective of the machine in the course of operation.
Fig. 7 is an elevational view diagrammatically illustrating the relationship of the pallet pusher rods and the conveyor belt during the off-bearing cycle.
Figure 3:
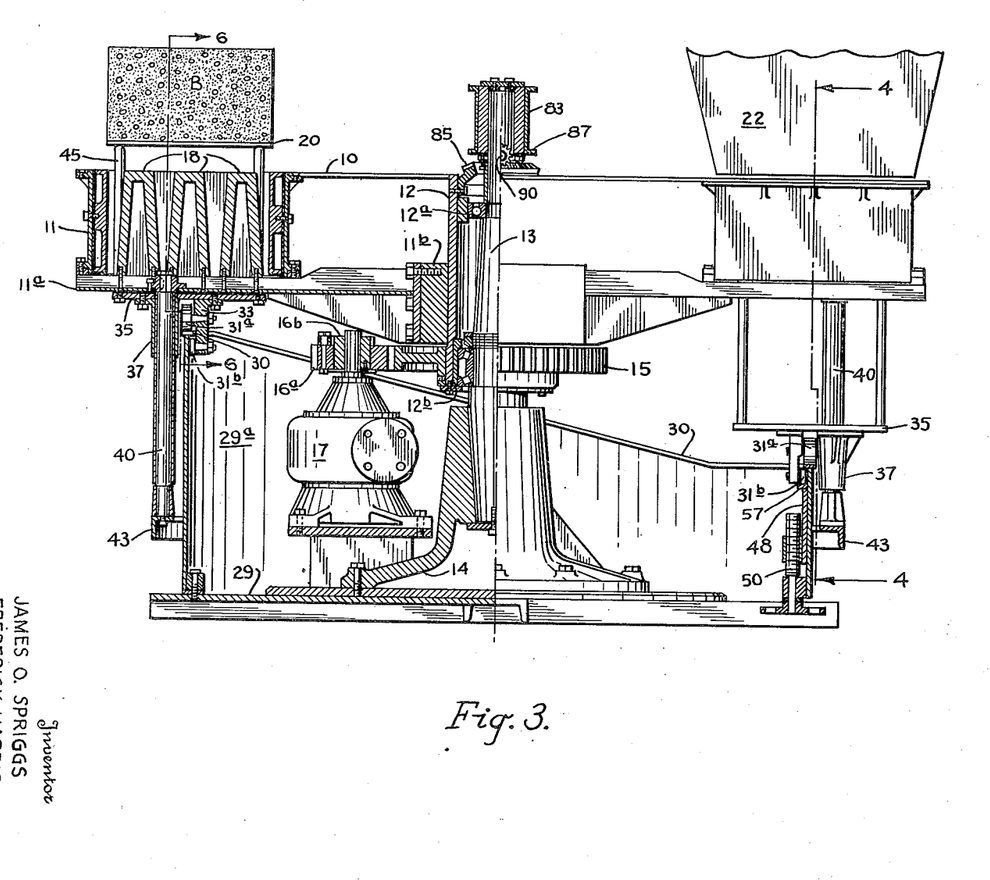
Fig. 3 is an elevational partial section of our machine showing details of the cam actuating mechanism.

With reference to Figs. 1, 2 and 3, our invention comprises a circular mold table 10 rotatably mounted so as to effect a turntable. The turntable has a plurality of radially disposed mold pockets; i. e., mold boxes 11 removably secured to the table, angularly spaced therearound, and supported from below on respective channel members 11a secured to a hub 11b (Fig. 3). The turntable is rotatably journalled by means of ball bearing 12a and roller bearing 12b to a centrally located stationary shaft 13 supported at its lower extremity by a suitable base frame 14. Hub 11b is keyed to sleeve 12. Appended to the lower extremity of the sleeve 12 is a gear 15. Meshing with gear 15 is spur gear 16a and ratchet 16b, driven by motor 17 for counter-clockwise rotation of the turntable 10. It is obvious other suitable means of rotation could be employed.

As shown, the mold pockets 11 are designed, in this case, for the manufacture of cored cinder blocks B, or the like, and to this end are provided with a plurality of vertically extending hobs 18 of selectable size and shape, secured, as by bolts, to channel members 11a on which they rest. The hobs provide suitably shaped air spaces in the finished molded product.

Fixed to the top of the centrally located shaft 13, is an automatic pallet storage and feed mechanism, indicated in general at 19, Fig. 2. The details and operation of this mechanism will be given in full hereinafter, but for the present it is sufficient to state that the same operates to deposit pallets 20 of selectable size and shape into the mold pockets as the same pass thereunder during the circuit of the turntable, the pallets being suitable to rest on the upper extremities of actuating rods 45 as hereinafter described.

Located at a suitable point in the circuit of the turntable, for the supply of a plastic mix to the mold pockets, is a hopper 21. The hopper 21 extends downwardly, opening in a mouth at 23 (Fig. 4) directly above the upper face of the turntable 10. The clearance between the mouth 23 of the hopper and the turntable is as close as permissible in order to prevent the mix from spilling out onto the turntable. The radial dimension of the hopper 21 measured from the center of the turntabel at its mouth 23 is substantially the same as the width of the openings defining the mold pockets 11.

Appended to the trailing edge of the hopper 21, as defined by the motion of the turntable 10, and adjacent to its mouth 23, is a vibrator mechanism 24 which may be either electrical or mechanical. This mechanism shown is a spring loaded electro-magnetic type now readily available on the market. As is clearly illustrated in Fig. 4, the vibrator mechanism 24 is carried by a suitable plate member 25. Member 25 is mechanically fastened at its upper longitudinal edge to the side of the hopper, and extends angularly downwardly to a point just above the turntable. The lower longitudinal edge of member 25 is mechanically fastened by means of a trowelling plate 26 to the adjacent edge of the hopper mouth 23. Trowelling plate 26 may extend either parallel to the face of the turntable or at a slight angle thereto, and is securely fastened to the hopper and to plate member 26 by means of end plates 27.

In operation, the vibrator mechanism 24 has a resultant force which is normal to the angular support member 25. This resultant force has a horizontal component acting on the sides of the hopper, partly through a rod 28 secured therein, from one side of the hopper to the other side, which acts to agitate and homogenize the plastic mix, also to shake the mix downward in the hopper and thereby assure the delivery of an adequate supply of mix to the mold pockets as the same pass under the hopper in the circuit of the turntable. This resultant force also has a downward vertical component which acts on plate member 26 to cause the same to concurrently vibrationally tamp and trowel the mix in the mold pockets as the same pass thereunder during the circuit of the turntable. It will be noted that the angle at which the vibrator is mounted relative to the turntable, determines both the vertical and horizontal forces of the vibrator. Consequently, if the compacting action provided by the plate member is to be increased or decreased, the angle of the vibrator support may be adjusted accordingly by any suitable means which will be evident to persons skilled in the art.

It will be appreciated that the rate of vibration of the mechanism 24 should be sufficiently high relative to the rate of rotation of the turntable as to avoid any gouging action on the blocks.

Figure 5:
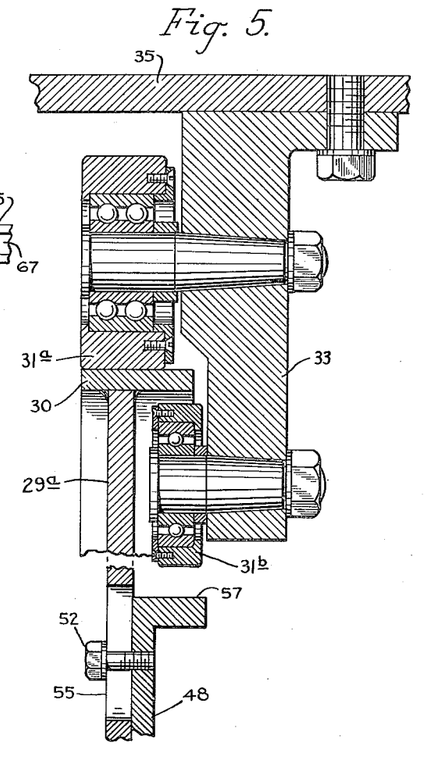
Fig. 5 is an enlarged section showing details of the cam and follower construction.
Figure 6:
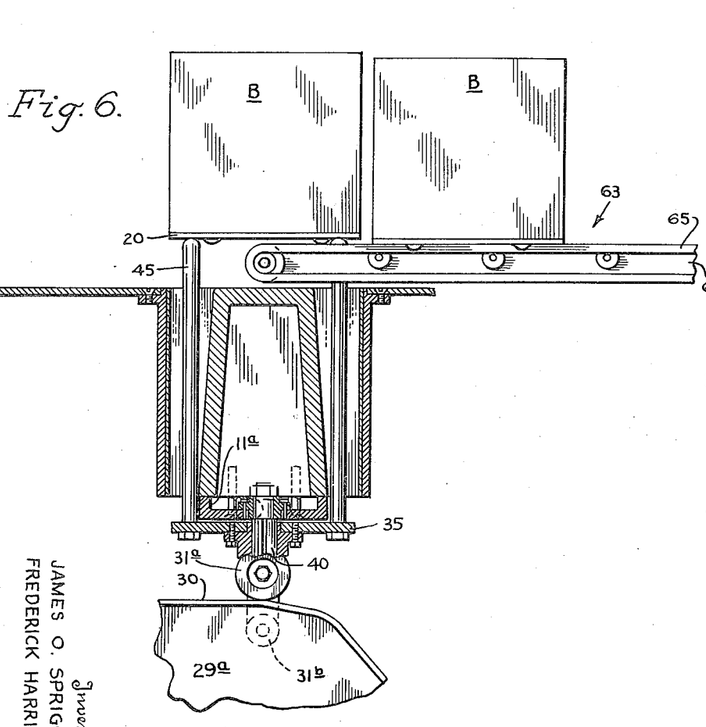
Fig. 6 is a fragmentary view of the relationship between the belt conveyor and the pallets for off-bearing the molded blocks.

Disposed beneath the turntable and supported by a frame 29 (Figs. 2 and 3) is a circular wall 29a supporting a cam track 30 for actuating pairs of rollers 31a and b associated with respective mold boxes 11 (Figs. 1, 3 and 5). Each pair of rollers is arranged to straddle the track 30 in vertical relation as shown. Ordinarily, rollers 31a engage track 30, rollers 31b being idle (Fig. 5) except where sharp incline of the track causes engagement between the underside thereof and said rollers 31b to cause positive downward displacement and where the rollers pass beneath the hopper. The pairs of rollers are journalled to members 33 secured to yokes 35 which in turn are secured to sleeve members 37 which are slidably arranged on vertical guide shafts 40, being splined thereto as shown in Fig. 6. The vertical guide shafts 40 (Fig. 3) are fixedly secured to respective channel members 11a and thus to mold boxes 11 at their upper ends and to a ring 43 at their lower ends. The ring 43 serves to maintain vertical alignment of the guide shafts and rotates therewith about the axis of the turntable.

Each yoke member 35 carries four rectangularly disposed pusher or lift rods 45 which are adapted to reciprocate vertically in respective mold boxes. The pallets 20 are deposited on the upper extremities of rods 45 and descend (Fig. 1) as the turntable rotates, by virtue of followers 31a and b engaging cam track 30.

Cam wall 29a is provided below hopper 21 with a vertically adjustable cam plate 48 having height determing screw means 50 and position kick means 52 riding in slots 55 (Figs. 1, 3 and 5). Cam plate 48 has a cam surface 57 adapted to engage the lower followers 31b as they pass below the hopper, thus determining the level at which respective pallets will be held in their corresponding mold boxes during the filling process in passing below the hopper, as well as determining the degree of compression exerted on blocks B as will be readily understood from Figs. 1 and 4; follower 31a being idle at the time 31b is riding on surface 57.

Figure 4:
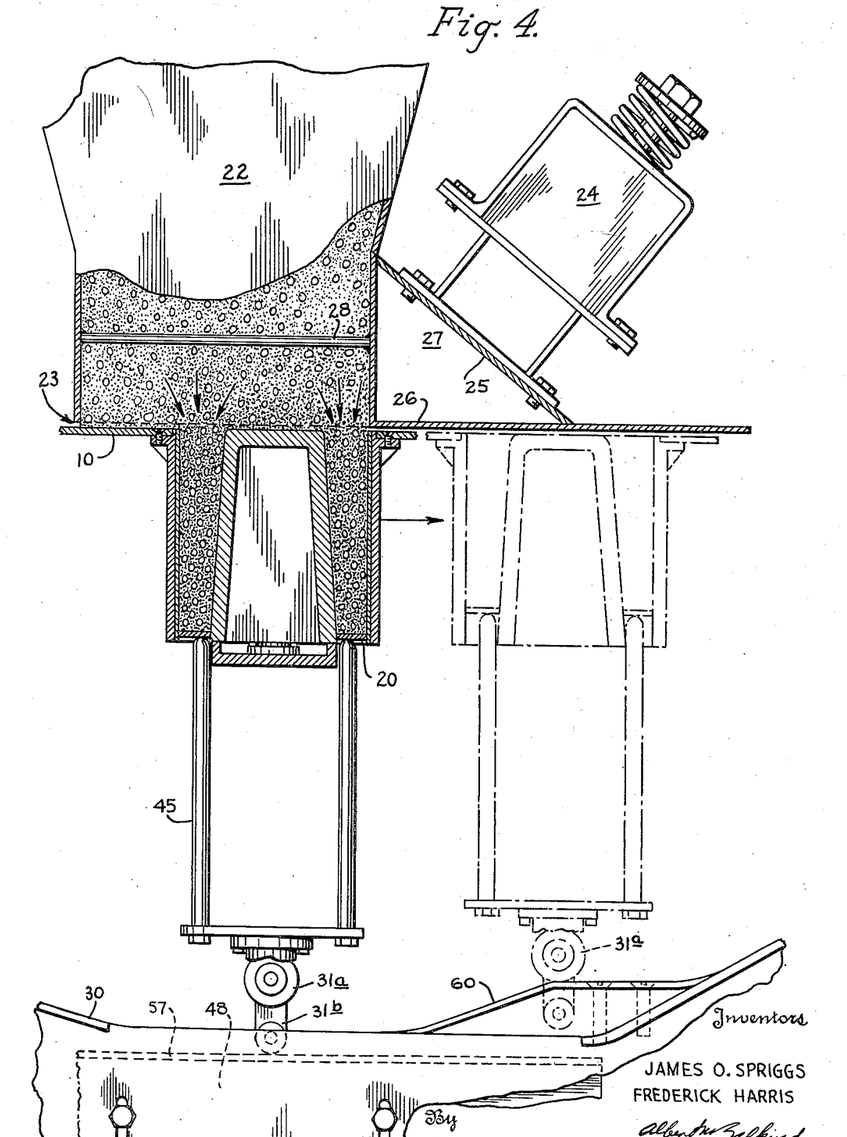
Fig. 4 is a fragmentary sectional elevation showing details of the hopper and vibrator arrangement.

Cam surface 30 is provided with a removable section, or shim (Fig. 11) of selected vertical dimension "V." Thus the final height of the blocks B is determined by the height of the shim, as will be understood from Fig. 4, since the upper follower 31a rides on section 60, roller 31b being idle at that time.

A conveyor system, generally indicated at 63 (Fig. 1), completes the final phase of the molding cycle. As shown in Figs. 1, 2, 6 and 7, the conveyor system comprises moving belts 65 supported on channels 67 and maintained in motion by a motor 70. The spacing of channels 67 is such as to fit between the rods 45 (Fig. 7) to off-bear the pallets carrying the blocks tangentially relative to the turntable. The dwell of cam track 30 below the inner end of the conveyor system at 30a (Figs. 1 and 7) is such as to hold the pallets slightly above the belt level, whence follows a relatively sharp drop 30b to deposit the pallets and blocks on the belt and at 30c to withdraw the rods below the table level so as to avoid interference with the conveyor as the table rotates. It will be appreciated that the underside of cam position 30b engages rollers 31b so as to ensure positive and rapid downward withdrawal of rods 45 to avoid interference with the conveyor structure during continued rotation of the turntable. The dwell in cam track at 30d holds the rods 45 at the appropriate height to receive the next pallet 20.

Figure 8:
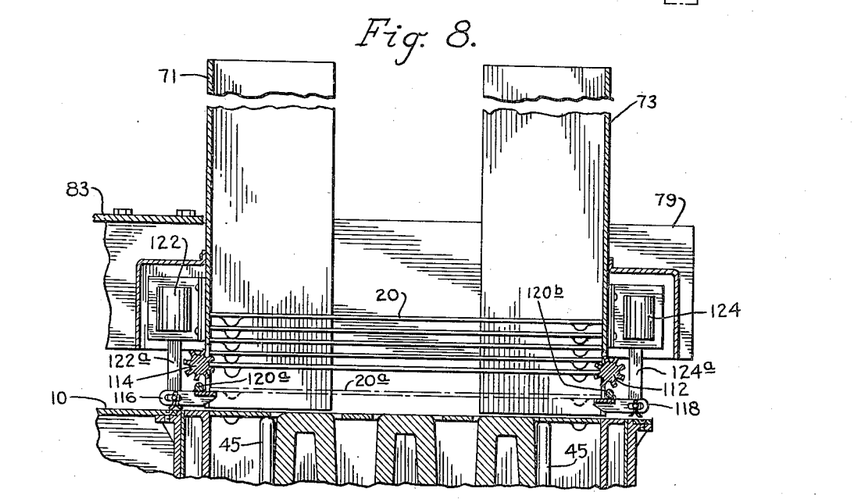
Fig. 8 is a section in elevation of a portion of the pallet dispensing magazine.
Figure 9:
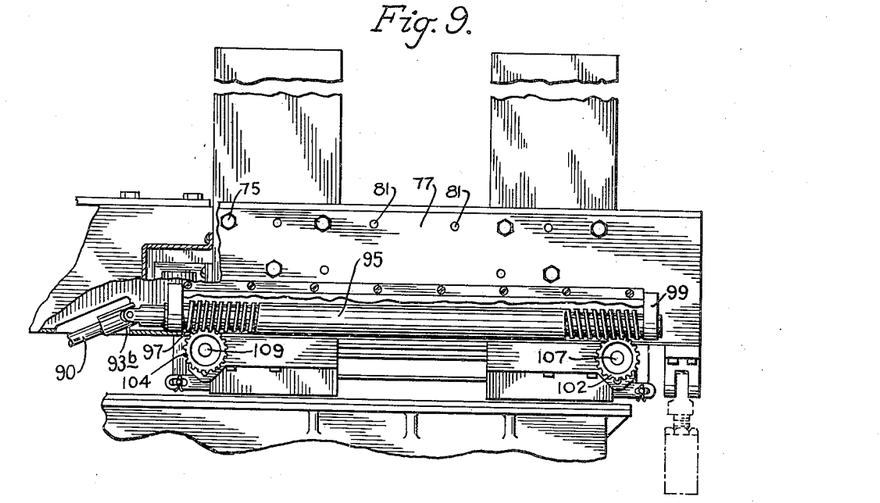
Fig. 9 is a fragmentary view in elevation of another portion of the pallet dispensing magazine.

Referring now to Figs. 2, 3, 8 and 9, the pallet storage magazine 19 and feed mechanism will be described. As herein illustrated (Fig. 8), this mechanism comprises a pair of U-shaped end retaining plates 71 and 73, secured, such as by bolts 75 to a pair of side frames 77 and 79. The side frames are provided with a number of holes 81 located at suitable points along their length in order that the spacing between the end retaining members 71 and 73 may be adjusted to accommodate various sizes of pallets. Secured to and supporting the side frames 77 and 79 is a yoke member 83 (Fig. 10) which is rotatively attached to shaft 13 by means of a collar 84 to which it is welded, which collar is frictionally clamped between plate 84a and flange 84b. Flange 84b is on the upper end of a sleeve 84c keyed to post 13. Adjustable screws 84d are provided to determine the frictional hold on collar 84. In normal operation magazine 19 is held fixed, with respect to the rotating table, by the frictional engagement provided by this structure, but may rotate under certain circumstances as hereinafter described under "Safety features," for the purpose of avoiding breakage should a pallet become jammed between it and the rotating table. Rotating with sleeve 12 is a gear 85. Meshing with gear 85 is bevel gear 87 which rotates shaft 90. Shaft 90 is journalled at one end through a universal coupling 93a to yoke member 83 and connected at its other end, through a universal coupling 93b, to a lead screw 95 (Fig. 9). Lead screw 95 is suitably journalled at each end and attached to side frame 77 and is cut with right hand threads 97 along its extremity nearest the center post and with left hand threads 99 along its extremity nearest the periphery of the mold plate 10. Engaging the right and left hand threads 97 and 99, respectively, of the lead screw are a pair of gears 102 and 104. Gears 102 and 104 drive a pair of shafts 107 and 109, respectively, which are journalled, by means not shown, in parallel relation to the transverse axis of the retaining members 77 and 79. Each of the shafts 107 and 109 drives an elongated star shaped gear 112 and 114, respectively, each having a number of teeth equal to the number of mold pockets 11, and which support and feed the pallets 20 by engaging the ends thereof. The star gears have a tooth length substantially equal to the width of the largest pallet with which use of our machine is contemplated so as to have marginal engagement substantially along the entire pallet edge.

For reasons which will hereinafter become apparent, gears 85 and 87 (Fig. 10) are cut so that one revolution of the former causes n revolutions of the latter; when n is the number of mold pockets 11 formed in the mold plate 10. Lead screw 95 and gears 102 and 104 are so cut that n revolutions of the lead screw causes one revolution of shafts 107 and 109.

Referring now to Fig. 8, it will be seen that star gears 112 and 114 rotate in reverse directions. With the aforementioned gear ratio between gears 87 and 89, one revolution of the mold plate 10 causes one revolution of the star gears.

As shown in Fig. 8, the pellets are constructed with motor grooves or other protuberances whereby they are suitably spaced to permit easy engagement with the teeth of the star gears. Accordingly, it will be understood that when the elements described above are properly related with respect to the location of any mold pocket 11, a pallet 20 will presumably be dropped into each mold pocket as it passes below magazine 19 as the turntable rotates. However, in the operation of depositing the pallets 20 into the mold pockets, small manufacturing variations prevent exact synchronism between the movement of the mold plate 10 and the gears and shafts, etc., of magazine 19. Accordingly, a pair of solenoid operated lever arms 116 and 118 are pivotally attached by pivot pins 120a and 120b respectively, to the end retaining members of the magazine in any suitable manner. The pallets are supported on arms 116 and 118 after being dropped by the star gears before final deposition to the mold pockets, as illustrated in Fig. 8 by the phantom pallet 20a. Related to arms 116 and 118 are respective solenoids 122 and 124, having plungers 122a and 124a loosely connected to arms 116 and 118. Upon energization, the plungers tip the arms to release the pallet hold thereon which then drops into a mold box below. As best shown in Fig. 8, the pallets fall only to the extent necessary to come to rest on the upper ends of rods 45, which ends are supported by virtue of the action of the cam track 39, so that the top surface of the pallet will be flush with the table surface in rest position, as also shown in Fig. 1.

Figures 10, 11:
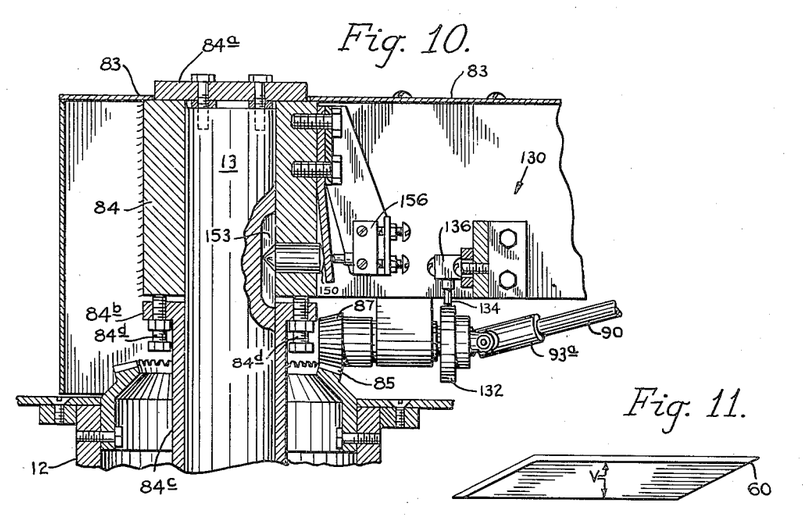
Fig. 10 is a fragmentary section in elevation of the gear drive for the pallet dropping mechanism showing the timing switch and safety detent.
Fig. 11 illustrates an interchangeable cam member adapted for selective use to predetermine the height of the blocks.

For the purpose of energization the solenoids at the proper time a cam operated switch, indicated in general at 130, Fig. 10, is provided. Referring now to Fig. 10, it will be seen that the cam operated switch 130 comprises a cam 132 which is rotative with pinion 87. Riding on the cam 132 is a follower 134 which operates a lever operated switch 136 of the type, for instance, commercially known as a "micro-switch." Actuation of the switch 136 energizes the solenoids. During each rotation of the cam, switch 136 is closed. Therefore, due to the speed relation between the cam 132 and the star wheels 112 and 114, a high degree of accuracy in the control over the final deposition of the pallets in the mold pockets 11 is effected.

*Safety features*

At times the pallets will drop unevenly into the pockets, whereby they may become wedged in the mold pockets. To prevent occurrences of this nature, the action of the star gears 112 and 114 and the cam operated switch 136 is set so that the pallets are dropped to the turntable 10 just ahead of the mold pockets, and are dragged into the mold pockets by one or more elongated resilient fingers 140 (Fig. 12) attached to the trailing edge of the magazine as the same passes under the magazine. The lower edges, 142 of the fingers 140 are disposed so as to ride just above the surface of the turntable 10. Should the pallet fail to enter the mold box properly, fingers 140 are flexed outwardly, thereby actuating the switch 144 which is similar to switch 136. Actuation of switch 144 operates to sound an alarm such as by impressing a suitable voltage to a bell 146 (Fig. 13) and at the same time serves to de-energize drive motor 17 through a motor relay 148.

It will be appreciated that the finger arrangement described above may be used on a machine wherein the solenoid and arm structure is omitted. In such case the timing of the star gears and turntable may be set so as to drop the pallets ahead of the mold pockets to the same extent as effected by the solenoids and arms.

Should a pallet become jammed between the turntable 10 and the magazine 19, sufficient force will be encountered to overcome the frictional grip on colar 84 (Fig. 10), thus yoke 83, including the magazine, will swing with the table, thereby avoiding breakage. Further, collar 84 is provided with a slidable pin 150 normally protruding into a groove 153 in post 13. The groove and pin are shaped so that rotation of yoke 83 with respect to post 13 will force the pin outwardly to actuate a switch 156, connected in the circuit shown in Fig. 13, to break the motor circuit.

Figures 12, 15:
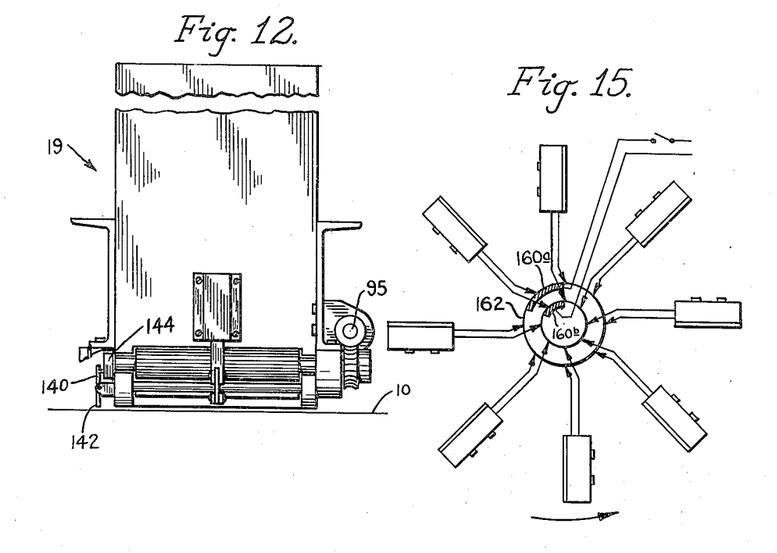
Fig. 12 is an elevational view showing protective fingers and the pallet dropping mechanism as seen from the left side in Fig. 9.
Fig. 15 shows the electrical circuit by which the individual vibrators of Fig. 14 are sequentially operated during rotation of the machine.
Figure 13:
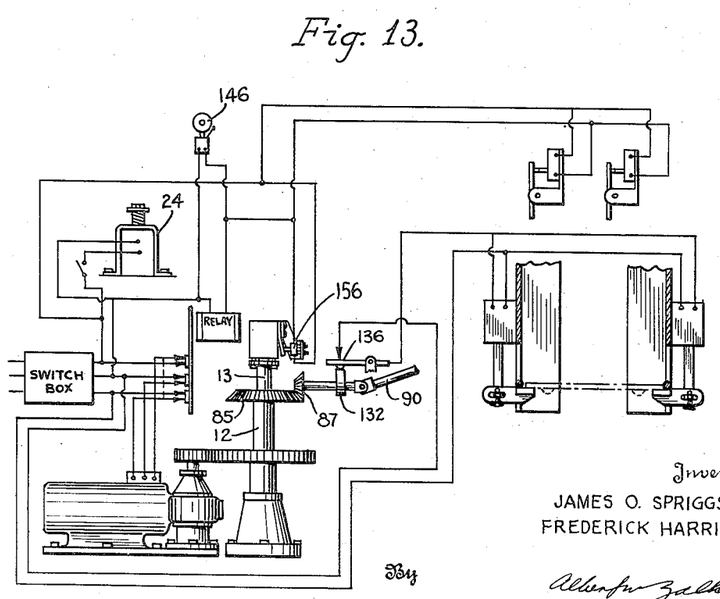
Fig. 13 shows the electrical circuit for the machine comprising the pallet dropping arrangement protective fingers and protective detent with relay, and motor and vibrator wiring.
Figure 14:
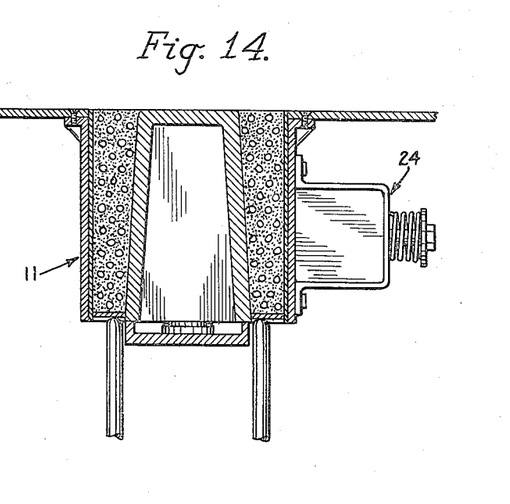
Fig. 14 is a sectional view in elevation of a mold box with individual vibrator, constituting a modification of our invention.

In Fig. 14 we show how our invention may be modified to the extent of providing an individual vibrator 24 for each mold box, to the end that the block therein is vibrated during a predetermined sector of the course of rotation of the table from hopper to conveyor. Fig. 15 shows the manner in which the duration of vibration may be determined by the use of contact segments 160a and 160b carried by insulating bands 162, which bands are stationary.

Although we have shown and described only certain specific embodiments of the present invention, we are fully aware of the many modifications possible thereof. Therefore, it is to be understood that we intend that the disclosure herein be taken for the purpose of illustration only and not as a definition of the limits of the invention.

What is claimed is:

1. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means cooperatively associated with said hopper means for vibrating the mix in the mold pockets by way of the mix in the hopper, said vibrator means including a trowel plate, said trowel plate extending substantially parallel to the upper face of said turntable and operative to concurrently vibrate and trowel the mix in the mold pockets as the same pass thereunder, and means for discharging the finished molded product comprising a conveyor means situated at a predetermined point in the circuit of said turntable, a plurality of lift rods supported by a yoke member and entering the bottom of each of said mold pockets for supporting the pallet and plastic mix thereon, a cam track disposed beneath the turntable, a roller attached to said yoke member and adapted to ride on said cam track during the circuit of said turntable, said cam track being arranged to force said lift rods gradually upwardly in the mold pockets, whereby the pallet bearing the finished molded product is raised out of the mold pocket at the location of the conveyor means, and to thereafter lower the lift rods downwardly to deposit the pallet bearing the finished molded product on the conveyor means.

2. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means cooperatively associated with said hopper means for vibrating the mix in said mold pockets by way of the mix in the hopper, said vibrator means including a vibrating trowel plate extending substantially parallel to the upper face of said turntable and operative to concurrently vibrate and trowel the mix in the mold pockets as the same pass thereunder, and means for discharging the finished molded product comprising a plurality of lift rods supported by a yoke member and entering the bottom of each of said mold pockets for supporting the pallet and plastic mix thereon, a cam track disposed beneath the turntable, a roller appended to said yoke member and adapted to ride on said cam track during the circuit of said turntable, said cam track being arranged to force said lift rods gradually upwardly in the mold pockets, whereby the pallet bearing the finished molded product is raised out of the mold pocket at a predetermined point in the circuit of the turntable.

3. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means including a vibrating trowel plate disposed substantially parallel to the upper face of said turntable operative to concurrently vibrate and trowel the mix in the mold pockets as the same pass thereunder, and means for discharging the finished molded product comprising a conveyor means situated at a predetermined point in the circuit of said turntable, a plurality of lift rods supported by a yoke member and entering the bottom of each of said mold pockets for supporting the pallet and plastic mix thereon, a cam track disposed beneath the turntable, a roller attached to said yoke member and adapted to ride on said cam track during the circuit of said turntable, said cam track being arranged to force said push rods gradually upwardly in the mold pockets, whereby the pallet bearing the finished molded product is raised out of the mold pocket at the location of the conveyor means, and to thereafter lower the lift rods downwardly to deposit the pallet bearing the finished molded product on the conveyor means.

4. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means cooperatively associated with said hopper means for vibrating the mix in said mold pockets by way of the mix in said hopper, said vibrator means including a vibrating trowel plate extending substantially parallel to the upper face of said turntable and operative to concurrently vibrate and trowel the mix in the mold pockets as the same pass thereunder, and means for discharging the finished molded product comprising a conveyor means situated at a predetermined point in the circuit of said turntable, a plurality of lift rods supported by a yoke member and entering the bottom of each of said mold pockets for supporting the pallet and plastic mix thereon, a cam track disposed beneath the turntable, a roller attached to said yoke member and adapted to ride on said cam track during the circuit of said turntable, said cam track being arranged to force said lift rods gradually upwardly in the mold pockets, whereby the pallet bearing the finished molded product is raised out of the mold pocket at the location of the conveyor means, and to thereafter lower the lift rods downwardly to deposit the pallet bearing the finished molded product on the conveyor means, said cam track having a raised section immediately beneath said vibrating trowel plate whereby the pallet bearing the plastic mix is forced upward into a pressure contact with said trowel plate.

5. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, and means for discharging the finished molded product comprising a conveyor means situated at a predetermined point in the circuit of said turntable, a plurality of lift rods supported by a yoke member and entering the bottom of each of said mold pockets for supporting the pallet and plastic mix thereon, a cam track disposed beneath the turntable, a roller attached to said yoke member and adapted to ride on said cam track during the circuit of said turntable, said cam track being arranged to force said lift rods gradually upwardly in the mold pockets, whereby the pallet bearing the finished molded product is raised out of the mold pocket at the location of the conveyor means, and to thereafter lower the lift rods downwardly to deposit the pallet bearing the finished molded product on the conveyor means.

6. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means cooperatively associated with said hopper means for vibrating the mix in said mold pockets by way of the mix in said hopper, said vibrator means including a vibrating trowel plate extending substantially parallel to the upper face of said turntable and operative to concurrently vibrate and trowel the mix in the mold pockets as the same pass thereunder, and means including a cam track disposed beneath the turntable for discharging the pallet bearing the finished molded product from the mold pocket at a predetermined point in the circuit of said turntable.

7. In an artificial building stone molding machine, a mold plate having a plurality of spaced mold pockets formed therein, means for moving said mold plate and pockets in a definite path, means operative during the circuit of said mold plate for the insertion of a pallet in each of said mold pockets, means located in the path of said mold pockets operative to inject a suitable plastic mix into each of said mold pockets, vibrator means including a vibrating trowel plate disposed substantially parallel to the upper face of said mold plate operative to concurrently vibrate and trowel the mix in the mold pockets as the same pass thereunder, and means for discharging the finished molded product comprising a cam track disposed adjacent the path of said mold plate, a plurality of lift rods supported by a yoke member and entering the bottom of each of said mold pockets for supporting the pallet and plastic mix thereon, and a roller attached to said yoke member and riding on said cam track, said cam track having a raised portion immediately adjacent the vibrating trowel plate whereby the pallet bearing the plastic mix is forced upward into pressure contact with said trowel plate.

8. In an artificial building stone molding machine, a rotating turntable having a plurality of mold pockets formed therein, means operative during the circuit of said turntable for the insertion of a pallet in each of said mold pockets, vibrating hopper communicating with the upper face of said turntable in the path of said mold pockets operative to inject, by vibration, a suitable plastic mix into said mold pockets as the same pass thereunder, and means including a cam track disposed beneath the turntable for discharging the pallet bearing the finished molded product from the mold pocket at a predetermined point in the circuit of said turntable.

9. In an artificial building stone molding machine, a rotating turntable having a plurality of mold pockets formed therein, means operative during the circuit of said turntable for the insertion of a pallet in each of said mold pockets, hopper means located at a predetermined point in the circuit of said turntable operative to inject a suitable plastic mix into each of said mold pockets, vibrator means cooperatively associated with said hopper means for vibrating the mix in said mold pockets by way of the mix in said hopper, said vibrator means including a vibrating trowel plate extending substantially parallel to the upper face of said turntable and operative to concurrently vibrate and trowel the mix in the mold pockets as the same pass thereunder, and means for discharging the finished molded product comprising a cam track disposed adjacent the path of said mold plate, a plurality of lift rods supported by a yoke member and entering the bottom of each of said mold pockets for supporting the pallet and plastic mix thereon, a roller attached to said yoke member and riding on said cam track, said cam track having a raised portion immediately adjacent the vibrating trowel plate whereby the pallet bearing the plastic mix is forced upward into pressure contact with said trowel plate.

JAMES O. SPRIGGS.
FREDERICK HARRIS.

REFERENCES CITED

The following references are of record in the file of this patent:

UNITED STATES PATENTS

| Number | Name | Date |
|---|---|---|
| 1,440,715 | Bliss | Jan. 2, 1923 |
| 1,481,159 | Straub | Jan. 15, 1924 |
| 1,559,200 | Straight | Oct. 27, 1925 |
| 1,661,008 | Payne | Feb. 28, 1928 |
| 1,742,845 | Brainerd | Jan. 7, 1930 |
| 1,716,349 | Wallace | June 4, 1929 |
| 2,317,574 | Williams | Apr. 27, 1943 |
| 2,320,728 | Hume | June 1, 1943 |
| 2,446,061 | Reed | July 27, 1948 |